US010949452B2

(12) United States Patent
Srinivasan et al.

(10) Patent No.: US 10,949,452 B2
(45) Date of Patent: Mar. 16, 2021

(54) CONSTRUCTING CONTENT BASED ON MULTI-SENTENCE COMPRESSION OF SOURCE CONTENT (71) Applicant: ADOBE INC., San Jose, CA (US)

(72) Inventors: Balaji Vasan Srinivasan, Bangalore (IN); Pranav Ravindra Maneriker, Bengaluru (IN); Natwar Modani, Bangalore (IN); Kundan Krishna, Bangalore (IN)

(73) Assignee: Adobe Inc., San Jose, CA (US)

( * ) Notice: Subject to any disclaimer, the term of this patent is extended or adjusted under 35 U.S.C. 154(b) by 261 days.

(21) Appl. No.: 15/854,320

(22) Filed: Dec. 26, 2017

(65) Prior Publication Data
US 2019/0197184 A1 Jun. 27, 2019

(51) Int. Cl.
G06F 16/30 (2019.01)
G06F 16/27 (2019.01)
G06F 16/33 (2019.01)
G06F 16/338 (2019.01)
G06F 16/31 (2019.01)
G06F 40/151 (2020.01)
G06F 40/205 (2020.01)
G06F 40/284 (2020.01)

(52) U.S. Cl.
CPC .......... G06F 16/334 (2019.01); G06F 16/313 (2019.01); G06F 16/338 (2019.01); G06F 40/151 (2020.01); G06F 40/205 (2020.01); G06F 40/284 (2020.01)

(58) Field of Classification Search
CPC ............... G06F 17/277; G06F 17/2705; G06F 17/2264; G06F 16/338; G06F 16/334

USPC .......................................................... 707/693
See application file for complete search history.

(56) References Cited

U.S. PATENT DOCUMENTS

2012/0109966 A1* 5/2012 Liang .................. G06F 16/3323
707/740

OTHER PUBLICATIONS

May A Sayed: "Utilizing Graph-based Representation of Text in a Hybrid Approach to Multiple Documents Summarization", (Master of Computer Science Thesis, Department of Computer Science and Engineering, The American University in Cairo, May 2014 (Year: 2014).*

Nenkova et al.: "Automatic Summarization", Foundations and Trends® in Information Retrieval vol. 5, Nos. 2-3 (2011) 103-233 (Year: 2011).*

(Continued)

Primary Examiner — Kuen S Lu
(74) Attorney, Agent, or Firm — Shook, Hardy & Bacon, L.L.P.

(57) ABSTRACT

Embodiments of the present invention provide systems, methods, and computer storage media directed to facilitating corpus-based content generation, in particular, using graph-based multi-sentence compression to generate a final content output. In one embodiment, pre-existing source content is identified and retrieved from a corpus. The source content is then parsed into sentence tokens, mapped and weighted. The sentence tokens are further parsed into word tokens and weighted. The mapped word tokens are then compressed into candidate sentences to be used in a final content. The final content is assembled using ranked candidate sentences, such that the final content is organized to reduce information redundancy and optimize content cohesion.

20 Claims, 7 Drawing Sheets (56) References Cited

OTHER PUBLICATIONS

Aula, A. (2003). Query Formulation in Web Information Search. In ICWI (pp. 403-410).
Bairi, R. B., Udupa, R., & Ramakrishnan, G. (Oct. 2016). A framework for task-specific short document expansion. In Proceedings of the 25th ACM International on Conference on Information and Knowledge Management (pp. 791-800). ACM.
Banerjee, S., & Mitra, P. (Jan. 2016). WikiWrite: Generating Wikipedia Articles Automatically. In IJCAI (pp. 2740-2746).
Banerjee, S., Mitra, P., & Sugiyama, K. (Jul. 2015). Multi-Document Abstractive Summarization Using ILP Based Multi-Sentence Compression. In IJCAI (pp. 1208-1214).
Bing, L., Li, P., Liao, Y., Lam, W., Guo, W., & Passonneau, R. J. (2015). Abstractive multi-document summarization via phrase selection and merging. arXiv preprint arXiv:1506.01597.
Carbonell, J., & Goldstein, J. (Aug. 1998). The use of MMR, diversity-based reranking for reordering documents and producing summaries. In Proceedings of the 21st annual international ACM SIGIR conference on Research and development in information retrieval (pp. 335-336). ACM.
Dang, H. T. (Apr. 2007). Overview of DUC 2007 Tasks and Evaluation Results. Presentation at DUC 2007. 53 slides.
Deshpande, P., Barzilay, R., & Karger, D. R. (2007). Randomized Decoding for Selection-and-Ordering Problems. In HLT-NAACL (pp. 444-451).
Filippova, K. (Aug. 2010). Multi-sentence compression: Finding shortest paths in word graphs. In Proceedings of the 23rd International Conference on Computational Linguistics (pp. 322-330). Association for Computational Linguistics.
Galgani, F., Compton, P., & Hoffmann, A. (Apr. 2012). Combining different summarization techniques for legal text. In Proceedings of the Workshop on Innovative Hybrid Approaches to the Processing of Textual Data (pp. 115-123). Association for Computational Linguistics.
Kincaid, J. P., Fishburne Jr, R. P., Rogers, R. L., & Chissom, B. S. (1975). Derivation of new readability formulas (automated readability index, fog count and flesch reading ease formula) for navy enlisted personnel (No. RBR-8-75). Naval Technical Training Command Millington TN Research Branch.
Lapata, M., & Barzilay, R. (Jul. 2005). Automatic evaluation of text coherence: Models and representations. In IJCAI (vol. 5, pp. 1085-1090).
Li, Y., & Li, S. (2014). Query-focused Multi-Document Summarization: Combining a Topic Model with Graph-based Semi-supervised Learning. In COLING (pp. 1197-1207).
Lin, C. Y. (Jul. 2004). Rouge: A package for automatic evaluation of summaries. In Text summarization branches out: Proceedings of the ACL-04 workshop (vol. 8).
Mihalcea, R., & Csomai, A. (Nov. 2007). Wikify!: linking documents to encyclopedic knowledge. In Proceedings of the sixteenth ACM conference on Conference on information and knowledge management (pp. 233-242). ACM.
Nenkova, A., & McKeown, K. (2011). Automatic summarization. Foundations and Trends® in Information Retrieval, 5 (2-3), 103-233.
Sauper, C., & Barzilay, R. (Aug. 2009). Automatically generating wikipedia articles: A structure-aware approach. In Proceedings of the Joint Conference of the 47th Annual Meeting of the ACL and the 4th International Joint Conference on Natural Language Processing of the AFNLP: vol. 1-vol. 1 (pp. 208-216). Association for Computational Linguistics.
Schlaefer, N., Chu-Carroll, J., Nyberg, E., Fan, J., Zadrozny, W., & Ferrucci, D. (Oct. 2011). Statistical source expansion for question answering. In Proceedings of the 20th ACM international conference on Information and knowledge management (pp. 345-354). ACM.
Srinivasan, B. V., Roy, R. S., Jhamtani, H., Modani, N., & Chhaya, N. (2017). Corpus-based automatic text expansion. Cicling.
Taneva, B., & Weikum, G. (Oct. 2013). Gem-based entity-knowledge maintenance. In Proceedings of the 22nd ACM international conference on Information & Knowledge Management (pp. 149-158). ACM.
Wang, L., Raghavan, H., Castelli, V., Florian, R., & Cardie, C. (2016). A sentence compression based framework to query-focused multi-document summarization. arXiv preprint arXiv:1606.07548.

\* cited by examiner

CONSTRUCTING CONTENT BASED ON MULTI-SENTENCE COMPRESSION OF SOURCE CONTENT

BACKGROUND

With the proliferation in the number of channels on which content is consumed, a content writer (e.g., author) engaged in writing textual content (e.g., articles) for various purposes needs to ensure that their generated content caters to the requirements of their chosen channel of content distribution and the needs of their desired target audience. For example, while certain channels like social media platforms may require shorter content representations, other channels such as newsletters, informational pamphlets, newspapers, and websites may allow for more elaborate content representations.

To cater to the demands of specifically chosen channels and target audiences, content authors often search for pre-existing content that can be re-purposed to generate new content or to elaborate on content. Often, the additional information for which the author is searching already exists, for example, on the Internet or in an enterprise setting (e.g., a company's document database), in various manifestations. In the absence of suitable assistance, content authors manually curate such content from a corpus, thereby reducing their productivity. For example, it can be time intensive to search for relevant information, analyze the relevant information to remove duplicative information and ensure coverage of various topics, and thereafter prepare well-written content. In some cases, the tedium of manual content curation from pre-existing content leads an author to generate content from scratch, rather than spending time searching for difficult-to-locate pre-existing content to repurpose. Such manual content curation, however, can result in various errors and inconsistencies.

SUMMARY

Embodiments of the present invention relate to methods, systems, and computer readable media for generating content using existing content. In this regard, source content that is relevant to an input snippet can be accessed and used as a basis for generating new content. Upon identifying relevant source content, the source content is generally compressed to generate new candidate content. The candidate content can then be assessed to sequence the content in a cohesive manner to form a final content. Advantageously, corpus-based automatic content generation optimizes for relevance based on an input snippet (e.g., keywords, phrases, or sentences), covers different information within the generated final content, minimizes content redundancy, and improves the coherence of the final content.

To generate new content, embodiments described herein facilitate extracting the intent of a user from an input snippet. Thereafter, pre-existing source content (e.g., fragments of textual information) in a corpus can be identified and retrieved for use in generating candidate content. In particular, the input snippet is used to formulate a query that identifies pre-existing source content to be retrieved from a corpus. In addition, the retrieved source content from the corpus are compressed to form new candidate sentences to be included in a final content output. Specifically, a graph-based formulation and weighting system are utilized to facilitate multi-sentence compression to generate new candidate content. Candidate content generation can be iteratively performed until retrieved source content relevant to the snippet is exhausted. The newly generated candidate content are ranked and sequenced to form a coherent final content. As can be appreciated, the final content can conform to a content length desired by a user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Textual content is generally prepared for different purposes. By way of example, textual content may be an article an author wishes to construct detailing various rules and regulations. Textual content may also include an article an author wishes to generate detailing new and improved specifications of a recently released technology for posting on a company's website or in the product's instruction manual, user guide, or quick start guide. Textual content may further encompass a longer article to be published in a professional journal, such as a medical journal, detailing risk factors, symptoms, treatment, and prevention for a particular ailment. In preparing such textual content, the author may account for the various lengths of the desired content, the channels of content distribution, and/or the intended target audience.

Oftentimes, the information an author is seeking to cover in a new article already exists. For example, desired information may exist in an enterprise corpus or on the Internet in some manifestation, including past articles, fact sheets, technical specification documents, and other documents, which can be repurposed for the author's current need. Such information, however, may be distributed across numerous documents and systems. As a result, locating and identifying desired information is oftentimes difficult and time consuming.

Further, upon searching for and identifying relevant information, content authors often manually compose new content, which is also time consuming and error-prone. In this regard, upon identifying information of interest, an author analyzes the data and identifies how to compose new content based on the obtained information. For example, an author may identify which information to use and how to structure the information. Unfortunately, in addition to being time consuming, such manual content generation can result in duplicative information, grammatical errors, incoherency, etc. Additionally, in the absence of a source retrieval mechanism suitable to identify information desired by authors, the authors generally manually create content from scratch, which further reduces productivity.

In an effort to avoid manual searching for additional source information to create a new content, one conventional approach includes identifying key concepts in an initial document and linking those concepts to a corresponding Wikipedia page. An author may then navigate to and examine the linked Wikipedia pages to determine if the pages contain useful information the author wishes to manually repurpose to generate content. However, while this solution identifies relevant Wikipedia pages that may contain useful information, it only reduces the amount of manual searching required. Further, an author still needs to manually generate content after manually reviewing the Wikipedia pages to identify any useful information.

There have also been some efforts towards providing content in the context of knowledge management. One such solution aims to enhance question answering by utilizing an expansion algorithm to automatically extend a given text corpus with related content from a large external source such as the Internet. In particular, this solution expands upon a "seed document" using Internet resources to construct an answer based on "paragraph nuggets." However, this solution is not intended for human consumption, but rather is ideally suitable for only the question answering space. Additionally, this solution does not account for lexical and semantic redundancies in the answer, which are undesirable for a content author. More recent text generation relies on training a neural network that can learn the generation process. Such neural network training, however, relies on an extensive training corpus that includes both a content snippet and an intended content generation, requiring non-trivial annotating.

Accordingly, embodiments described herein are directed to automatically generating content using existing content. In this regard, embodiments described herein automatically generate content, also referred to herein as final content, using available source content without utilizing training data. In operation, based on a snippet input by a user, relevant source content can be identified. In embodiments, content is generated from a set of preexisting source content covering various aspects of the target information to diversify or expand coverage of topics covered in the content generation. Using such relevant source content, candidate content, such as candidate sentences, can be generated. As discussed herein, candidate content generation identifies content relevant to a user's input and compresses content to minimize redundancy in the content. To select appropriate content for construction, a graph representation that represents various sentences can be used. The most "rewarding" portion of the graph representation is identified and the corresponding sentences can be compressed to generate candidate content with minimal content redundancy. The content compression reduces the syntactic and lexical redundancies arising due to multiple manifestations of the same information in different parts of the content corpus. Further, content compression enables the generation of new content by observing the sentence constructs in the corpus, rather than simply selecting sentences from the corpus. Upon generating candidate content from the most "rewarding" portion of the graph representation, the graph is adjusted to account for the information in the generated candidate content thereby increasing information coverage in the subsequently generated content. As can be appreciated, candidate content can be iteratively generated until the overall information relevant to the user input is exhausted (at least to an extent) in the graph representation.

Upon generating candidate content, final content can be selected. In embodiments, a Mixed Integer Program (MIP) is utilized to select content that maximizes the relevance to the user input as well as cohesion. In this regard, the candidate content can be sequenced and/or assembled in a cohesive manner. Further, in optimizing the final content, the final content can be constructed in accordance with a certain budget, or desired length of content. As such, a final content can be output having compressed sentences along with a sequence to yield a cohesive content of a desired length.

Figure 1:
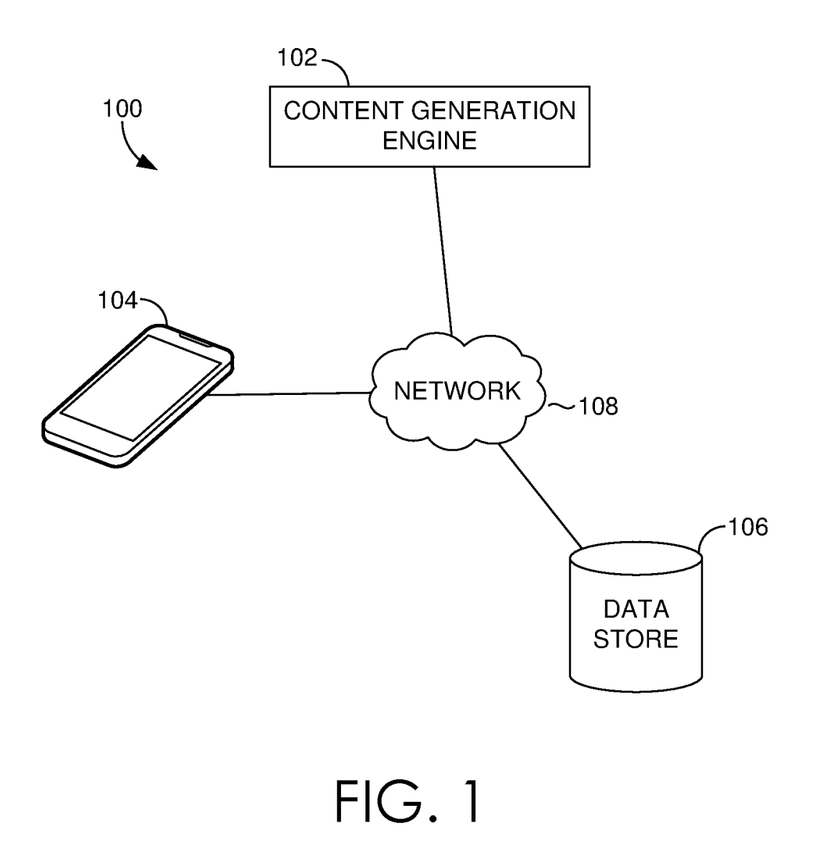
FIG. 1 is a schematic depiction of a system for facilitating content generation, in accordance with embodiments of the present invention.

Turning now to FIG. 1, a schematic depiction is provided illustrating an exemplary system 100 in which some embodiments of the present invention may be employed. Among other components not shown, the environment 100 may include a content generation engine 102, user device 104, and a data store 106. It should be understood that the system 100 shown in FIG. 1 is an example of one suitable computing system. Any of the components shown in FIG. 1 may be implemented via any type of computing device, such as computing device 700 described with reference to FIG. 7, for example. The components may communicate with each other via one or more networks 108, which may include, without limitation, one or more local area networks (LANs) and/or wide area networks (WANs). Such networking environments are commonplace in offices, enterprise-wide computer networks, intranets, and the Internet.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, system 100 facilitates content generation using existing content. As used herein, content generally refers to electronic textual content, such as a document, webpage, article, or the like. The content generated using pre-existing source content is generally referred to herein as a final content. Source content generally describes pre-existing textual content, for example, in a corpus. In this regard, source content may include, for instance, a wide variety of documents located on the Internet or within a data store.

At a high-level, final content is generated using pre-existing source content from a corpus that once retrieved, is parsed, mapped, weighted, and compressed to form candidate content, generally in the form of a sentence. Candidate content, as used herein, generally refers to a newly generated content that may be used in the final content. Candidate content is generally described herein as a candidate sentence constructed using a graph-based compression of similar sentences from source content. Candidate content, however, can be various other fragments of content and is not intended to be limited to a sentence. Further, candidate content can be generated in various manners. As described herein, the candidate content can cover different aspects of the author-entered snippet. The candidate content can then be weighted and sequenced to generate a coherent final content that the author may then utilize and/or edit to reach an acceptable, final version of the content.

By way of example only, assume an author, such as an employee of an enterprise company, wishes to learn more about specific company rules and regulations for an activity or task the employee must complete, and wishes to generate a single content containing the specific rules and regulations information. Assume too, that the information the employee seeks to repurpose to generate the rules and regulations final content exists as source content in the enterprise company's corpus in various manifestations across numerous documents. In such a case, the employee inputs a snippet (e.g., a sentence, phrase, or keyword) relating to the rules and regulations the employee desires to learn about. Upon obtaining the snippet, the author need is extracted to formulate a query. The query can then be used to identify and retrieve source content relevant to the entered snippet (e.g., the sentence, phrase, or keyword relating to the specific rules and regulations about which the employee desires to learn) in the enterprise company's corpus. The retrieved source content containing the rules and regulations information is then parsed into sentences, mapped to a selection graph, and weighted. Thereafter, the sentences are further parsed into word tokens, mapped to a compression graph, and weighted. The mapped word tokens are then compressed into candidate content, such as candidate sentences, to be included in the final content output. The generated candidate content can each be different and contain different information from the source content relevant to the desired rules and regulations. Such candidate content is then weighted and sequenced to output a final, coherent content relating to the rules and regulations.

Returning to FIG. 1, in operation, the user device 104 can access the content generation engine 102 over a network 108 (e.g., a LAN or the Internet). For instance, the user device 104 may provide and/or receive data from the content generation engine 106 via the network 108. Network 108 may include multiple networks, or a network of networks, but is shown in simple form so as not to obscure aspects of the present disclosure. By way of example, network 108 can include one or more wide area networks (WANs), one or more local area networks (LANs), one or more public networks, such as the Internet, and/or one or more private networks. Networking environments are commonplace in offices, enterprise-wide computer networks, intranets, and the Internet. Accordingly, network 108 is not described in significant detail.

A user device, such as user device 104, may be any computing device that is capable of facilitating a user to provide a snippet. A snippet, as used herein, generally refers to an author-entered item of text that is an indicator of the author's intent. In this regard, a snippet may take many forms, such as, for example, a word, a phrase, a sentence, a paragraph, a set of keywords, or the like. The snippet can be analyzed to formulate a query to identify and retrieve source content from a corpus. For example, a user may provide a snippet to the content generation engine 102 via a browser or application installed on the user device 104. Further, any type of user interface may be used to input such a snippet. In some cases, a user may input a snippet, for example, by typing or copying/pasting a snippet.

In response to providing a snippet, the user device 104 may obtain and present final content, or portion thereof. In this regard, final content generated in response to the user-provided snippet can be provided to the user device for display to a user (e.g., via a browser or application installed on the user device 104).

In some cases, the user device 104 accesses the content generation engine 102 via a web browser, terminal, or standalone PC application operable on the user device. User device 104 might be operated by an administrator, which may be an individual(s) that manages content associated with a document, a website, an application, or the like. For instance, a user may be any individual, such as an author or publisher, associated with an entity publishing the content (e.g., via the Internet). While only one user device 104 is illustrated in FIG. 1, multiple user devices associated with any number of users may be utilized to carry out embodiments described herein. The user device 104 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, user device 104 may include one or more processors, and one or more computer-readable media. The computer-readable media may include computer-readable instructions executable by the one or more processors.

The data store 106 (e.g., corpus) includes, among other data, source content data that may contain author-desired information used to facilitate candidate content generation and final content generation. As described in more detail below, the data store 106 may include source content data including electronic textual content, such as a document, webpage, article, or the like, and/or metadata associated therewith. Such source content data may be stored in the data store 106 and accessible to any component of the system 100. The data store may also be updated at any time, including an increase or decrease in the amount of source content data or an increase or decrease in the amount content in the data store that is not relevant to the author-entered snippet. Further, information covered in the various documents within the corpus may be changed or updated at any time.

The content generation engine 102 is generally configured to generate candidate content (e.g., sentences) from the existing source content and, thereafter, utilize such candidate content to construct a coherent final content. In particular, the content generation engine 102 can identify and retrieve source content, parse and compress the source content into candidate sentences, and assemble candidate sentences into a coherent final content. In implementation, and at a high-level, the content generation engine 102 formulates a query to identify and retrieve source content from a corpus. In particular, the content generation engine 102 can extract author intent from author-entered snippet and uses the author intent to formulate the query. The query then identifies and retrieves the source content from the corpus. The retrieved source content is then parsed and compressed to generate candidate sentences. The candidate sentence are then sequenced to generate a coherent final content output.

Figure 2:
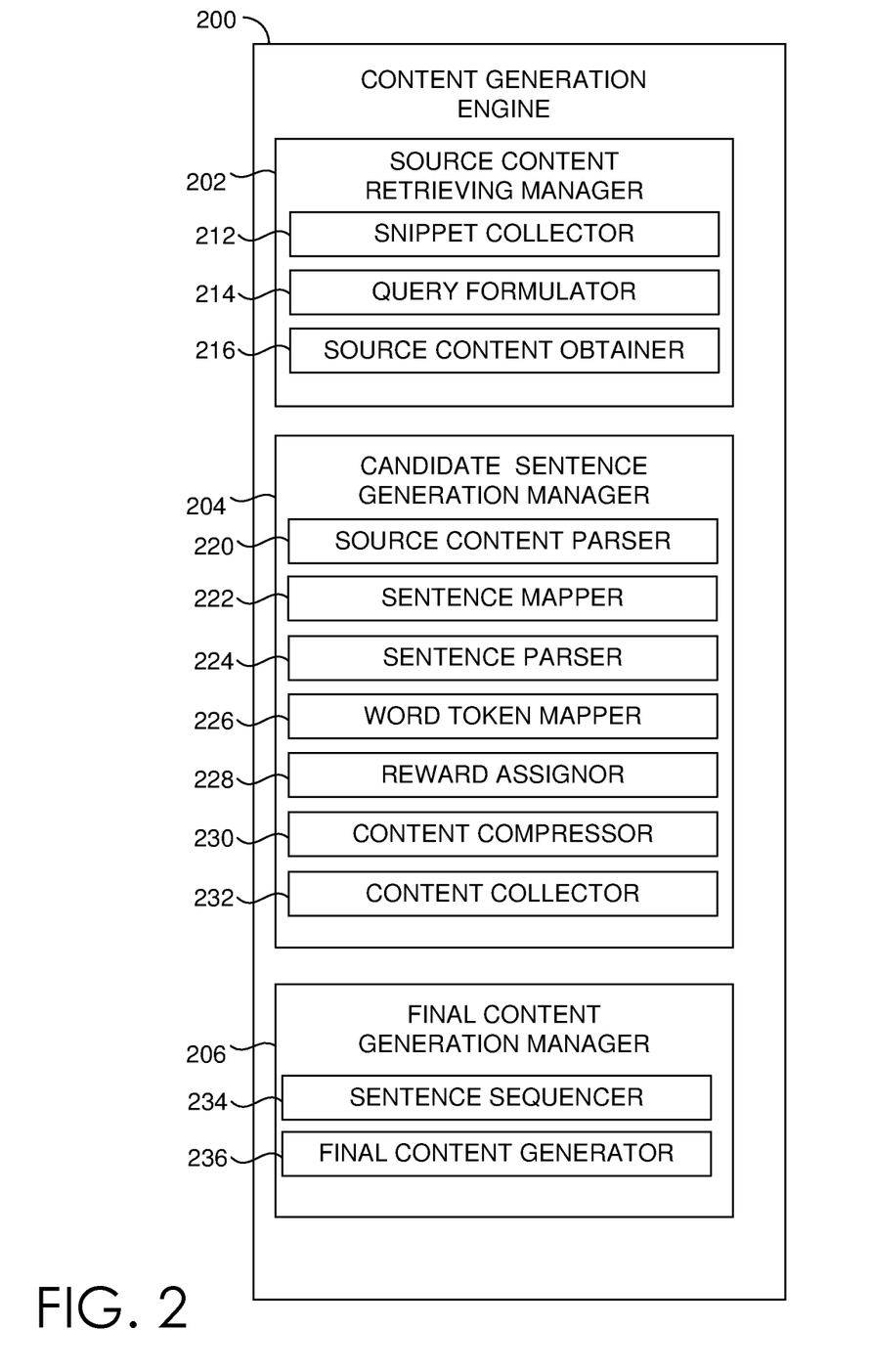
FIG. 2 is a depiction of a content generation engine, in accordance with embodiments of the present invention.

An exemplary content generation engine is provided in FIG. 2. As shown in FIG. 2, a content generation engine 200 includes a source content retrieving manager 202, a candidate content generation manager 204, and a final content generation manager 206. The source content retrieving manager 202 generally facilitates the retrieval of pre-existing source content from the corpus. The candidate content generation manager 204 utilizes the pre-existing source content (e.g., via graph-based sentence compression) to generate candidate content. The final content generation manager 206 generally utilizes the candidate content to generate a final content, for example, to output to a user device. Advantageously, such a produced final content conveys relevant information in a cohesive and non-redundant manner.

Although illustrated as separate components of the content generation engine 200, any number of components can be used to perform the functionality described herein. Further, although illustrated as being a part of a content generation engine, the components can be distributed via any number of devices. For example, a source content retrieving manager can be provided via one device, server, or cluster of servers, while the candidate content generation manager can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As described, the source content retrieving manager 202 is generally configured to collect retrieved source content from a corpus to be used to generate candidate content. A source content manager 202 may include a snippet collector 212, a query formulator 214, and a source content obtainer 216. Although illustrated as separate components of the source content retrieving manager 202, any number of components can be used to perform the functionality described herein.

The snippet collector 212 is configured to collect or obtain a snippet, for example, input via a user (e.g., author). As described, a snippet can be keywords, phrases, and sentences, but is not exclusive to those textual arrangements. A snippet may be collected or obtained in any manner. In some cases, a snippet is provided by a user of the content generation engine, such as an enterprise content author. In this regard, an enterprise content author or set of authors might enter or input a snippet, for example, via a graphical user interface accessible by way of an application on a user device. As an example, a user might enter a snippet via user device 104 of FIG. 1 that is connected to the network 108. For instance, an enterprise content author might provide, for example, a keyword, sentence, or phrase.

The query formulator 214 is configured to identify or extract the user's intent (i.e., author need) from the input snippet. In accordance with the user's intent, the query formulator 214 can formulate a query to identify and obtain source content from the corpus that is relevant to the snippet. To identify user intent, a set of keywords can be extracted from or identified within the input snippet. In embodiments, a top set of keyword(s) "K" in the snippet can be extracted using an inverse document frequency (IDF) of the words in the corpus. Such an approach can capture the most significant keywords in the snippet with respect to the corpus. Upon obtaining a set of keywords, a query can be generated by concatenating such keywords, or a portion thereof.

As can be appreciated, the number of keywords selected can impact the relevance and the amount of source content available and retrieved. For example, a lower value of K keywords can result in the query under-representing source content in the corpus, and retrieving a larger amount of source content that may not be very relevant to the input snippet. On the other hand, a higher value of K keywords can result in a more specific query that may not retrieve as much source content from the corpus. Further, in embodiments, term frequency within a snippet sentence, phrase, or the like, is not considered in the weighting process for choice of K, as most terms are present only once in a snippet, and multiple occurrences may not be deliberate, but rather by chance or mistake, and thus misleading.

The source content obtainer 216 is generally configured to obtain source content, or content fragments, relevant to the generated query. That is, the source content obtainer 216 utilizes the query to obtain relevant source content (e.g., from a corpus). Such source content can be obtained from any number of sources, such as various distributed sources. As described herein, choice of K impacts the relevant amount of source content that is identified in the corpus by the source content obtainer 216 and retrieved from the corpus by the source content. For example, returning to the employee author desiring to generate content regarding the specific company rules and regulations, a higher value of K may result in a more specific query that may retrieve less, and narrowly tailored source content from the corpus regarding only the rules and regulations the author specified. However, a lower value of K may result in the query under-representing the source content in the corpus and retrieving source content that covers, in addition to author's desired rules and regulations, additional information that covers, for example, other company rules and regulations about which the author did not intend to learn or generate a content.

As described, the candidate content generation manager 204 is generally configured to generate candidate content by compressing identified and retrieved source content from a corpus. A candidate content generation manager 204 may include a source content parser 220, a sentence mapper 222, a sentence parser 224, a word token mapper 226, a reward assignor 228, a content compressor 230, and a content collector 232. Although illustrated as separate components of the candidate content generation manager 204, any number of components can be used to perform the functionality described herein.

The source content parser 220 is configured to parse the source content, or content fragments, obtained by the source content retriever 218. In embodiments, the obtained source content can be parsed into sentences. In that regard, the source content parser 220 decomposes the retrieved source content into individual sentences in order to structure the sentences in a form suitable for mapping the sentences. Although generally discussed as parsing the content into sentences, as can be appreciated, other content fragments may be used to parse the source content.

The sentence mapper 222 generally maps the sentences to a first graph, referred to herein as a selection graph. In particular, the sentences can be graphically represented using nodular notation, in which each sentence is represented by a node on the selection graph.

The reward assignor 228 assigns an initial reward (i.e., a node weight) to each node on the selection graph. In embodiments, an initial reward or weight assigned to a node can be based on the node's similarity to the query. Additionally or alternatively, an initial reward or weight assigned to the node can be based on the amount of information that is present in the sentence associated with the node. For example, a higher reward might indicate that the sentence encompasses multiple concepts rather than a single concept or topic. The edges between pairs of nodes can also be provided an edge weight based on information overlap between the corresponding nodes.

The sentence parser 224 is generally configured to parse the sentences into word tokens. In that regard, the sentence parser 224 decomposes the sentence tokens into individual word tokens in order for the words to be in a form suitable for the word token mapper 226 to map the word tokens to a second graph, generally referred to as a compression graph. In particular, the sentence parser iteratively selects a sub-graph (i.e., portion) of the selection graph for parsing. The portion of the selection graph that is selected for parsing and compression can be the portion, or set of sentences, identified as a most rewarding portion of the selection graph. That is, a portion of the selection graph that includes nodes closely related to one another can be identified for sentence compression. In one embodiment, a selected sub-graph may include a node along with its 1-hop or 2-hop neighbors. In such case, the sentences corresponding with such nodes can be parsed into word tokens. By way of example only, the node with the maximum gain, along with the sentence corresponding to that node and the sentences in the node's 1-hop or 2-hop neighborhood, are selected and put into a set "S" which can then be used for the first iteration of multi-sentence compression. In other words, the node on the selection graph, its corresponding sentence, and its corresponding 1-hop or 2-hop neighbors are selected and parsed into word tokens. For instance, iterative sentence-node selection may occur by choosing the node on the selection graph with the maximum gain first, which can be expressed by:

$$G^l_{v_i} = r_i^{l-1} + \sum_{v_j \in N_i} r_j^{l-1} \times w_{ij}$$

where the selection graph is given by G(v,e), each node on the selection graph representing a sentence from the source content is given by $v_i \in V$ in the graph, the initial reward is given by $r^o_i$ for $v_i$, $N_i$ refers to the neighbors of node vi, the edge weight between each pair of sentence-nodes is given by $w_{ij}$, gain is given by $G_{vi}$, and where 1 is the step where an initial sentence-node v*$_i$ is selected that has the maximum gain $G_{vi}$. Upon parsing the sentences into words, the word token mapper 226 maps the tokenized words to a second graph, generally referred to herein as a compression graph. In embodiments, the words are represented using nodular notation, in which each word is represented by a node on the compression graph, and each sentence represents a directed path in the compression graph. Specialized nodes serve as start-of-sentence and end-of-sentence nodes. A single node mapped to the compression graph can represent each occurrence of a word within the same part of speech (POS) tag.

The reward assignor 228 can assign an edge weight between each pair of word-nodes. Such a weight can represent the relation of the words to one another. For example, the edge weight can represent the number of times the ordered combination of those node-words occurs across all sentences within set S. The shortest paths (normalized by path length) can be identified and the top K generated sentences used for further processing, as described below.

The content compressor 230 is generally configured to generate candidate content from the compression graph. Accordingly, the content compressor 230 can identify paths, such as shortest paths (normalized by path length), on the compression graph, and compress that paths into candidate content, such as a candidate sentence(s). The candidate content generated by the content compressor 230 is generally content covering the information contained within the set of sentences from which the candidate content was generated. In one embodiment, the shortest paths are identified, and the top-K generated sentences are identified for compression. For example, in one implementation, the minimum number of words per generated sentence can be restricted to 10 words with one sentence selected each iteration. Such traversal of this path results in the generation of the most appropriate sentence based on the co-occurrences in the corpus. Generally, utilizing a shortest path yields a compressed form of content, such as a sentence, that captures information from multiple sentences.

In accordance with performing content compression, the reward assignor 228 can reassign rewards or weights. In this regard, a reward (i.e., weight) can be assigned to compressed candidate sentence based on its similarity to the query. In order to factor in the information captured by each sentence compressed into a candidate sentence for subsequent sub-graph selection within the selection graph, the reward assignor 228 can update the rewards of the vertices in the selection graph whose information overlap with the already generated candidate content is significant (or exceeds a threshold). This reduces the rewards for sentences which are covered by a current set of generated candidate sentences, thereby reducing the chance the same information already included in generated candidate content is included in subsequently generated candidate. In particular, this ensures that the information covered by the subsequent generation of candidate sentences is different from what is already generated, while ensuring the information coverage of the subsequently generated candidate sentences is still relevant to the input query.

The content collector 232 is generally configured to collect a set of candidate content. In this regard, the content collector 232 can collect generated candidate content after each iteration of compression. Advantageously, the generated candidate content, such as sentences, generally cover the information space relevant to the input snippet. As can be appreciated, any amount of candidate content may be generated and collected. For example, candidate content may be generated and collected until a threshold amount of candidate sentences are generated. As another example, candidate content generation may continue until there are no nodes left with a significant reward resulting in the same sub-graph being selected for compression in successive iterations.

As the compressed candidate content may not initially be grammatically correct and/or not ordered, the final content generation manager 206 can generate coherent final content. The final content generation manager 206 may include a sentence sequencer 234 and final content generator 236.

The content sequencer 234 is generally configured to sequence (i.e., assemble, organize) the candidate content into a coherent final content. In embodiments, the content sequencer 234 may sequence the candidate content by selecting an appropriate set of compressed content (e.g., sentences) to sequence along with their order via an integer linear program formulation (Mixed Integer Program (MIP)). The integer linear program objective can be given by:

$$J = \sum_{i=1}^{K} w_i x_i + \lambda \sum_{i,j|coh_{ij}>\sigma} coh_{i,j} y_{i,j} \quad (2)$$

such that:

$$\sum_{i=1}^{K} c_i x_i \leq B \quad (3)$$

$$y_{i,j} = 0 \text{ if } coh_{ij} < \sigma \text{ or } i = j \quad (4)$$

$$x_i + x_j \leq 1, \forall i, j \mid sim_{i,j} > 0.7 \quad (5)$$

$$\sum_i y_{s,i} = 1, \sum_i y_{i,e} = 1 \quad (6)$$

$$\sum_i y_{i,j} = \sum_i y_{j,i} \quad (7)$$

$$\sum_i y_{i,j} + \sum_i y_{j,i} = 2x_j \quad (8)$$

where the binary variable $x_i$ indicates the selection/non-selection of a compressed sentence i and the binary variable $y_{i,j}$ indicates a transition from a sentence $x_i$ and $x_j$. Traversing the path of the sentences via $y_{i,j}$ would yield the final generated sentence. The $w_i$ for each compressed sentence indicates a combination of the sentence's relevance to the snippet along with its overall linguistic quality. This ensures that the compressed sentence selected is not noisy and is relevant to the snippet. The second term in equation 2 maximizes the coherence of the selected flow of sentences. The constraint in equation 3 accounts for the length requirement of the author to limit the generated content to a target budget B. Equation 4 prohibits a flow of content between lesser coherent sentences and avoids cycles in the arcs. An arc between two nodes exists if both the sentences are selected for the final content and are contiguous. Equation 6 limits the number of starting and ending sentences to 1. Equations 7 and 8 limit the number of incoming and outgoing arcs from a selected node to 1 each, forcing a path via the arcs that can indicate the flow in the selected content.

The final content provider 236 is generally configured to output the sequenced set of candidate content, for example, to a user device. By way of example, the final content provider 236 is configured to output the sequenced content to, in some cases, the author who input the snippet. Embodiments described herein enable generation of the final content that reduces redundancy contained without the content, increases the overall coherence of the content, and increases the overall information coverage of the content. In particular, content compression (multi-sentence compression) is utilized to reduce redundant information in the candidate content by compressing information from multiple sentences into a single sentence. A graph-based candidate selection for compression enables covering diverse aspects around the final content output. Finally, utilizing an integer linear program formulation facilitates coherence in the final content output.

One example content generation algorithm based on an input snippet can be expressed as follows:

---

Algorithim 1: Content Generation

---

Input: q: Snippet input by author, $\mathcal{F}$: Set of all fragments
Output: $C$: Generated Expanded Content K ← Top-k keywords from q based on IDF from $\mathcal{F}$;
F ← query $\mathcal{F}$ with K;
$\mathcal{S}$ ← split F into sentences;
begin
  | $\mathcal{G}$ ← graph($\mathcal{V}$, ε) where,
  | $\mathcal{V}$ ← $\mathcal{S}$, with reward $r_{v_i}$ ← info content of $v_i$
  | ε ← {$e_{ij}$ | weight $w_{ij}$ ← info overlap($v_i,v_j$)}
end $\hat{\mathcal{S}}$ ← φ;
repeat
  | forall $v_i \in \mathcal{V}$ do
  |   | $N_i$ ← neighbours of $v_i$;
  |   | $G_{v_i} \leftarrow r_i + \sum_{v_j \in N_i} r_j \times w_{ij}$;
  | end
  | $v_{\chi}$ ← node with maximum $G_{v_i}$;
  | Γ ← subgraph of $\mathcal{G}$ with $v_{\chi}$ and its 2-hop neighbourhood;
  | $S_K$ ← top-$\mathcal{K}$ sentences after sentence compression on $v_i \in \Gamma$;
  | $\hat{\mathcal{S}} \leftarrow \hat{\mathcal{S}} \cup S_K$;
  | forall $v_k \in \mathcal{V}$ do
  |   | $r_k \leftarrow r_i \times (1-w_{\chi k})$;
  | end
until $\forall v_i, r_{v_i} \leq$ threshold;
$C$ ← ILP($\hat{\mathcal{S}}$);   // Integer Linear Program (Eqns. 2-8)
return $C$

---

Figure 3:
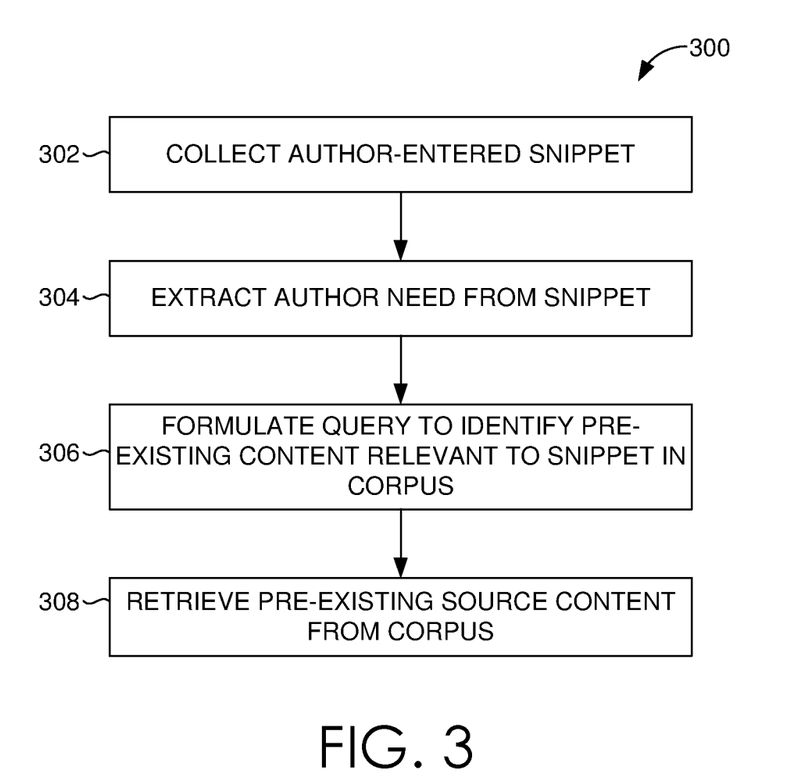
FIG. 3 is a depiction of a flow chart diagram showing a method to retrieve source content from a corpus, in accordance with embodiments of the present invention.

Now turning to FIG. 3, a flow chart diagram is illustrated showing an exemplary method 300 for retrieving source content from a corpus, in accordance with embodiments of the present invention. In embodiments, the method 300 is performed by a content generation engine, such as content generation engine 200 of FIG. 2. Initially, as indicated at block 302, an author-entered snippet is collected. An author-entered snippet may include keywords, sentences, phrase, or the like. At block 304, author need associated with the author-entered snippet is extracted. In some cases, the author need indicates an author's intent. Thereafter, at block 306, a query is formulated based on the extracted author need to identify pre-existing source content in a corpus relevant to the author-entered snippet. At block 308, identified pre-existing source content in a corpus is retrieved for further processing. As described, source content refers to electronic textual content, such as a document, webpage, articles, or the like.

Figure 4:
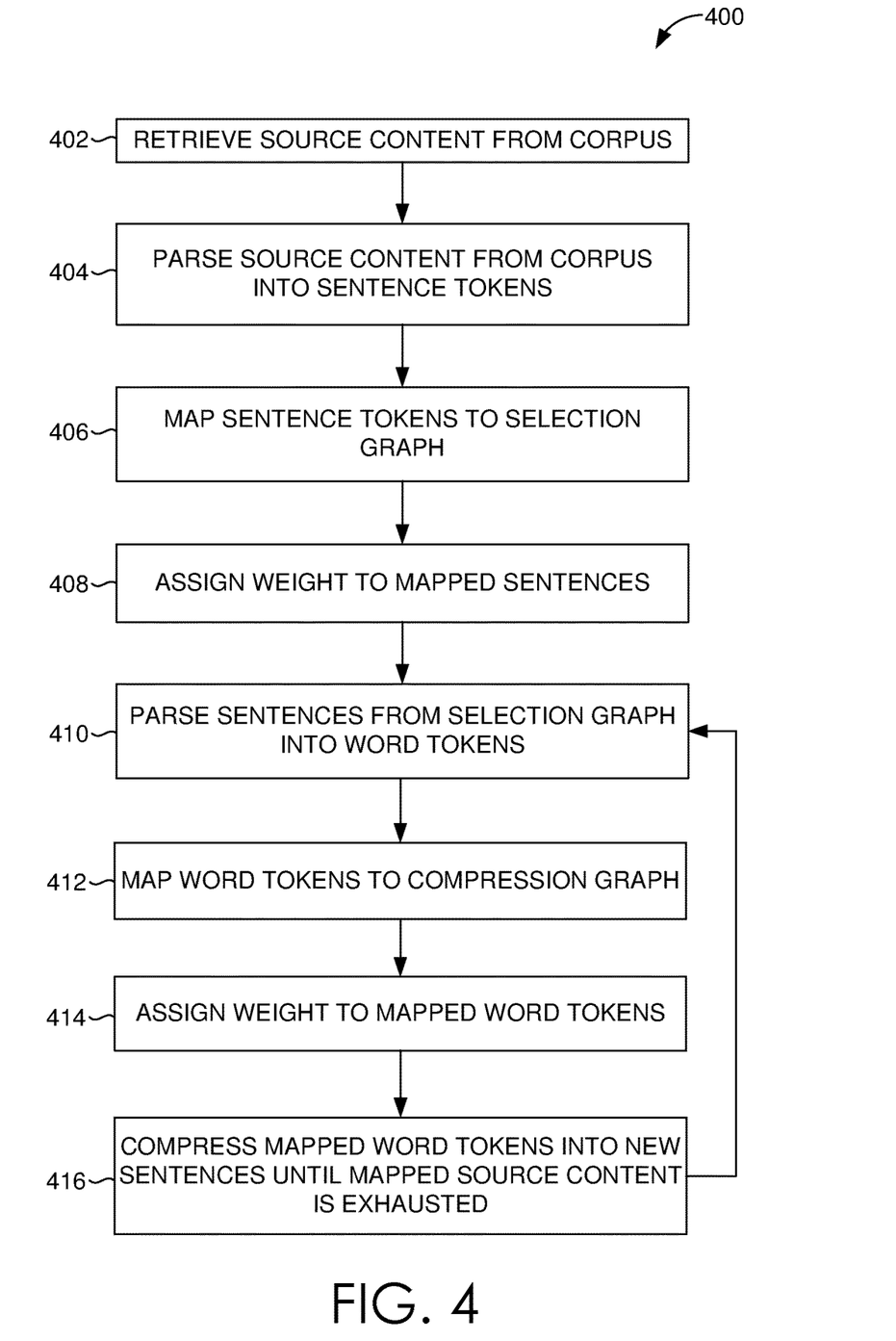
FIG. 4 is a depiction of a flow chart diagram showing a method to compress source content into candidate sentences, in accordance with embodiments of the present invention.

Referring now to FIG. 4, a flow chart diagram is illustrated showing an exemplary method 400 generating candidate sentences using multi-sentence compression, in accordance with embodiments of the present invention. In embodiments, the method of 400 is performed by a content generation engine, such as content generation engine 200 of FIG. 2. Initially, and as indicated at block 402, source content from a corpus is retrieved. At block 404, the source content is parsed into sentences. Referring to block 406, the sentences are then mapped to a selection graph. As described, the mapped sentence tokens are mapped in nodular notation, wherein each node represents a single sentence. At block 408, the mapped sentences are assigned an initial reward (i.e., weight) and an edge weight. In embodiments, the nodes mapped to the selection graph are weighted based on their similarity to the query, and the edges between each pair of nodes are assigned an edge weight based on their information overlap. At block 410, the sentences from the selection graph are parsed into word tokens. At block 412, the word tokens are mapped to a compression graph. In embodiments, mapped tokenized words are represented using nodular notation, in which each word is represented by a node on the compression graph, and each sentence represents a directed path in the compression graph. Specialized nodes serve as start-of-sentence and end-of-sentence nodes. A single node mapped to the compression graph can represent all occurrences of a word within the same POS tag. Referring to block, 414, an edge weight between each pair of word-nodes is assigned. The edge weight can represent the number of times the ordered combination of those node-words occurs across all sentences within set S. The shortest paths (normalized by path length) are identified and the top K generated sentences are used for further processing. At block 416, the mapped word tokens are compressed into candidate sentences to be used in a final content. Such candidate sentence generation can iteratively repeat until all relevant information mapped to the selection graph is exhausted.

Figure 5:
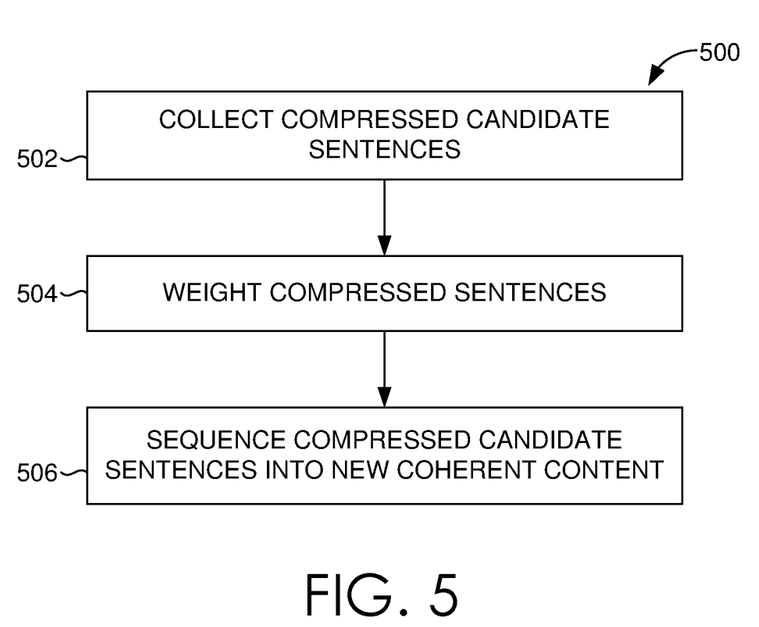
FIG. 5 is a depiction of a flow chart diagram showing a method to sequence candidate sentences into a coherent final content, in accordance with embodiments of the present invention.

Now turning to FIG. 5, a flow chart diagram is illustrated showing an exemplary method 500 of sequencing candidate sentences into a final content, in accordance with embodiments of the present invention. In embodiments, the method of 500 is performed by a content generation engine, such as content generation engine 200 of FIG. 2. Initially, and as indicated at block 502, compressed generated candidate sentences are collected. At block 504, the candidate sentences are assigned a weight. As described, the reward (i.e., weight) assigned to every compressed candidate sentence can be based on its similarity to the query. Referring to block 506, the weighted candidate sentences are sequenced to form a final content. The final content generally includes increased information coverage, reduced redundancy, and a coherent overall flow.

Figure 6:
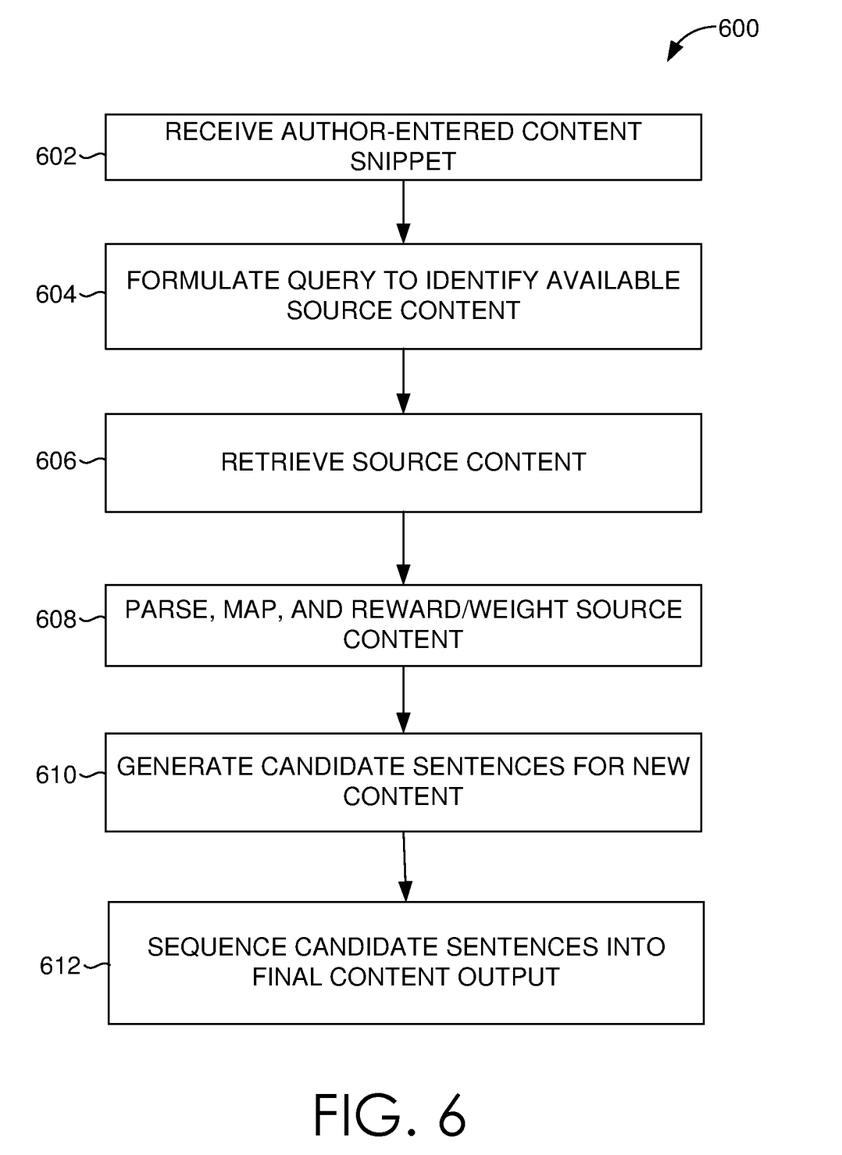
FIG. 6 is a depiction of a flow chart diagram of an example content generation approach, in accordance with embodiments of the present invention.

Now turning to FIG. 6, a flow chart diagram is illustrated showing an exemplary method 600 of sequencing candidate sentences into a final content. In embodiments, the method 600 is performed by a content generation engine, such as content generation engine 200 of FIG. 2. Initially, and as indicated at block 602, an author-entered snippet is received. An author-entered snippet may include keywords, sentences, phrase, or the like. At block 604, author need associated with the author-entered snippet is extracted to formulate a query. The query is formulated based on the extracted author need to identify pre-existing source content in a corpus relevant to the author-entered snippet. At block 606, identified pre-existing source content in a corpus is retrieved for further processing. As described, source content refers to electronic textual content, such as a document, webpage, articles, or the like. Referring to block 608, and as described herein, the retrieved source content is parsed, mapped, and weighted to a selection and compression graph for further processing and candidate sentence generation. In particular, the source content is parsed into sentence tokens, which are then mapped to a selection graph. The mapped sentence tokens can be mapped in nodular notation, wherein each node represents a single sentence. The mapped sentence tokens are then assigned an initial reward (i.e., weight) and an edge weight, where the nodes mapped to the selection graph are weighted based on their similarity to the query, and the edges between each pair of nodes are assigned an edge weight based on their information overlap. Further, the sentences from the selection graph are parsed into word tokens, the word tokens are then mapped to a compression graph. The mapped tokenized words can be represented using nodular notation with each word being represented by a node on the compression graph, and each sentence represented by a directed path in the compression graph. A single node mapped to the compression graph can represent all occurrences of a word within the same POS tag. An edge weight between each pair of word-nodes is assigned, the edge weight can represent the number of times the ordered combination of those node-words occurs across all sentences within set S. The shortest paths (normalized by path length) are identified, and the top K generated sentences are used for further processing. At block 610, candidate sentences are generated and weighted, wherein multi-sentence compression resulting in candidate sentence generation iteratively repeats until all relevant source content mapped to the selection graph is exhausted. At block 612, the candidate sentences are sequenced into a final content to be output to an author.

Figure 7:
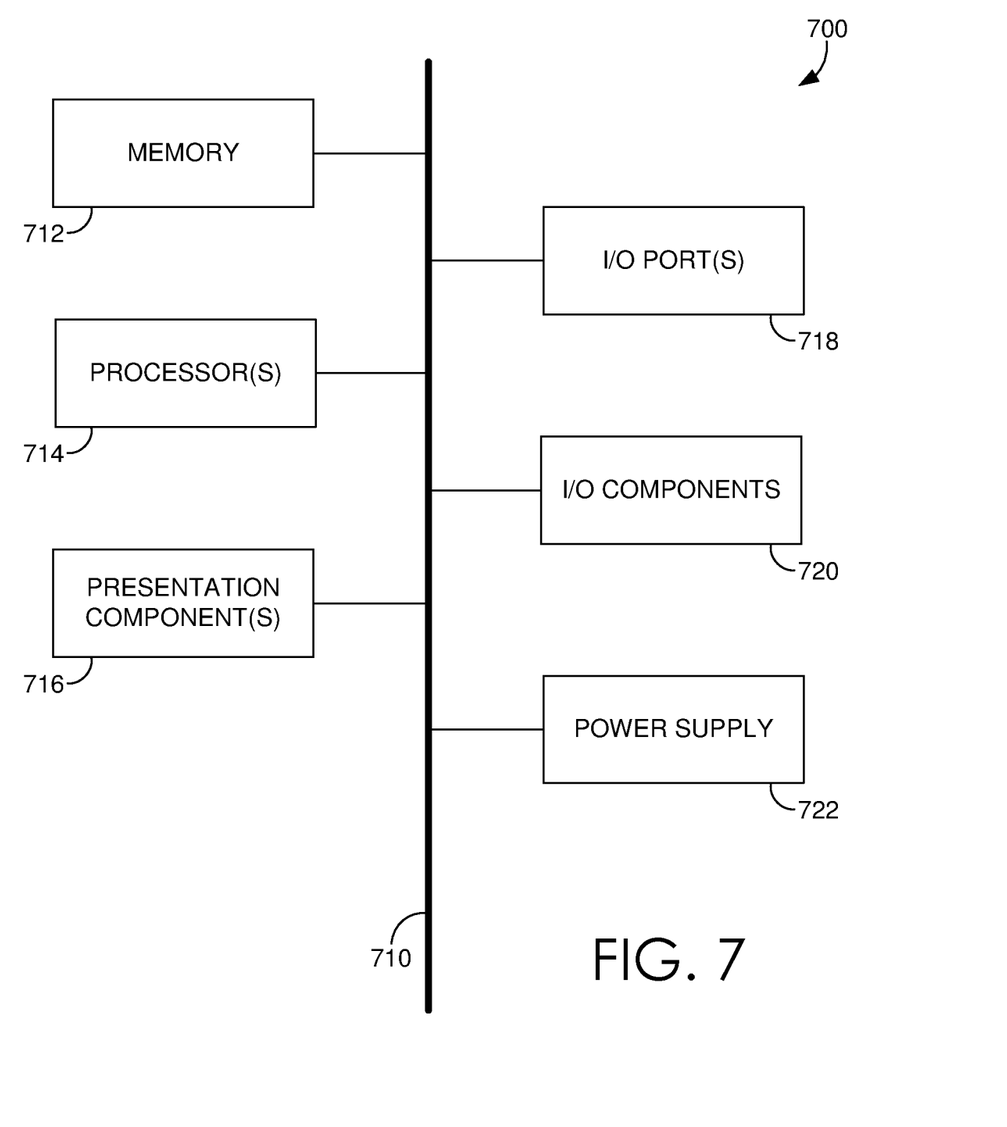
FIG. 7 is a depiction of a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output (I/O) ports 718, input/output components 720, and an illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by one or more computing devices, causes the one or more computing devices to perform operations, the operations comprising:
    obtaining source content relevant to an input snippet received via a user interface;
    utilizing a graphical representation of a plurality of sentences from the source content to identify a set of sentences in the relevant source content having overlapping information, wherein the overlapping information is determined based on a set of keywords that are relevant to the input snippet received via the user interface;
    generating a candidate sentence by compressing content in the set of sentences having overlapping information;
    generating a final content comprising a set of candidate sentences including the candidate sentence; and
    providing the final content as content automatically created in response to the input snippet.

2. The one or more computer storage media of claim 1, further comprising parsing the source content relevant to the input snippet into a plurality of sentences.

3. The one or more computer storage media of claim 2, wherein each of the plurality of sentences are mapped to a first graph and assigned a weight, wherein the weight relates to the relevance between the corresponding sentence and the input snippet received via the user interface.

4. The one or more computer storage media of claim 3, wherein at least a portion of the weighted sentences are parsed into a plurality of word tokens.

5. The one or more computer storage media of claim 4, wherein each of the plurality of word tokens are mapped to a second graph and assigned a weight, wherein the weight relates to the relevance between the corresponding word token and the input snippet received via the user interface.

6. The one or more computer storage media of claim 5, wherein the weighted word tokens are compressed to generate the candidate sentence.

7. The one or more computer storage media of claim 1, wherein the generation of the final content comprises sequencing at least a portion of the set of candidate sentences based on candidate sentence ranks, the final content assembled to reduce information coverage redundancy and optimize for overall coherence.

8. A computer implemented method for generating content based on graph-based sentence compression using retrieved source content present in a corpus, the method comprising:
- obtaining source content relevant to an input snippet received via a user interface;
- assigning a weight to each of a plurality of sentences from the source content based on a relevance between each of the plurality of sentences and the input snippet received via the user interface;
- mapping each of the plurality of sentences to a first graph based on the respective weight of each of the plurality of sentences from the source content;
- utilizing the first graph of the plurality of sentences from the source content to identify a set of sentences in the relevant source content having overlapping information, wherein the overlapping information is determined based on a set of keywords that are relevant to the input snippet;
- generating a candidate sentence by compressing content in the set of sentences having overlapping information;
- generating a final content comprising a set of candidate sentences including the candidate sentence; and
- providing the final content as content automatically created in response to the input snippet.

9. The method of claim 8, further comprising parsing the source content relevant to the input snippet into a plurality of sentences.

10. The method of claim 8, wherein at least a portion of the weighted sentences are parsed into a plurality of word tokens, wherein each of the plurality of word tokens are mapped to a second graph and assigned a weight, wherein the weight relates to the relevance between the corresponding word token and the input snippet.

11. The method of claim 10, wherein the weighted word tokens are compressed to generate the candidate sentence.

12. The method of claim 8, wherein the generation of the final content comprises sequencing at least a portion of the set of candidate sentences based on candidate sentence ranks, the final content assembled to reduce information coverage redundancy and optimize for overall coherence.

13. The method of claim 8, further comprising:
- assigning a weight to the candidate sentence, the weight relating to the relevance between the candidate sentence and the input snippet;
- reassigning an updated weight to each of the plurality of sentences based on the weight of the candidate sentence; and
- mapping each of the plurality of sentences to a second graph based on the respective weight of each of the plurality of sentences.

14. The method of claim 8, wherein the input snippet is received from a user via the user interface of an application of a user device.

15. A computer system comprising:
- one or more processors; and
- one or more non-transitory computer-readable storage media, coupled with the one or more processors, having instructions stored thereon, which, when executed by the one or more processors, cause the computing system to provide:
- means for identifying a set of sentences in source content having overlapping information, the set of sentences being relevant to an input snippet received via a user interface, wherein the overlapping information is determined based on a set of keywords that are relevant to the input snippet received via the user interface;
- means for generating a candidate sentence by compressing content in the set of sentences having overlapping information; and
- means for generating a final content comprising a set of candidate sentences including the candidate sentence.

16. The system of claim 15, further comprising means for parsing the source content relevant to the input snippet into a plurality of sentences.

17. The system of claim 16, wherein each of the plurality of sentences are mapped to a first graph and assigned a weight, the weight relating to the relevance between a corresponding sentence and the input snippet.

18. The system of claim 17, wherein the weighted sentences are parsed into a plurality of word tokens.

19. The system of claim 18, wherein each of the word tokens are mapped to a second graph and assigned a weight, the weight relating to the relevance between the corresponding word token and the input snippet.

20. The system of claim 19, wherein the weighted word tokens are compressed to generate the candidate content.

* * * * *